May 15, 1962  W. E. HENNELLS  3,034,527
SAFETY CHECK AND EXHAUST VALVE
Filed Nov. 17, 1959
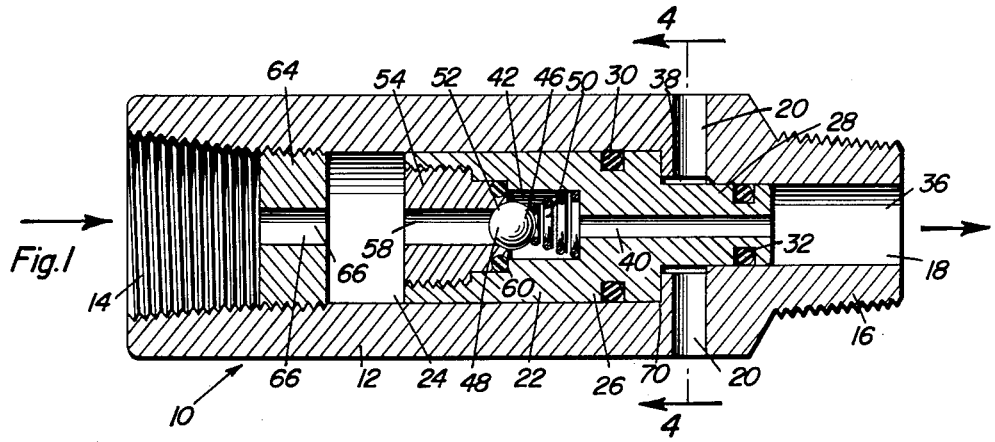
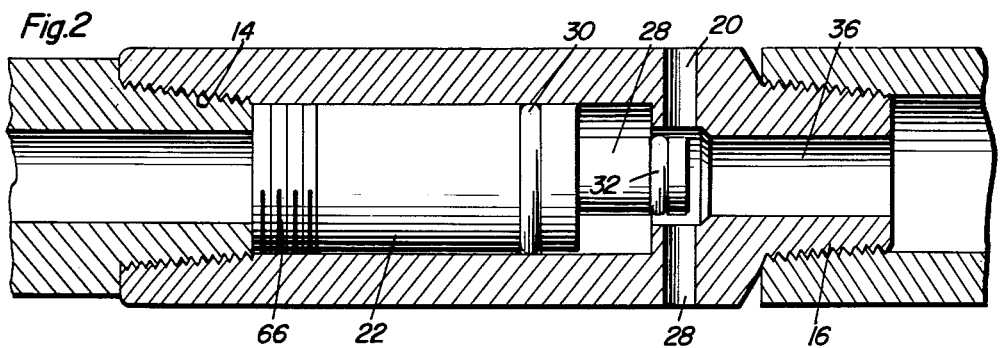
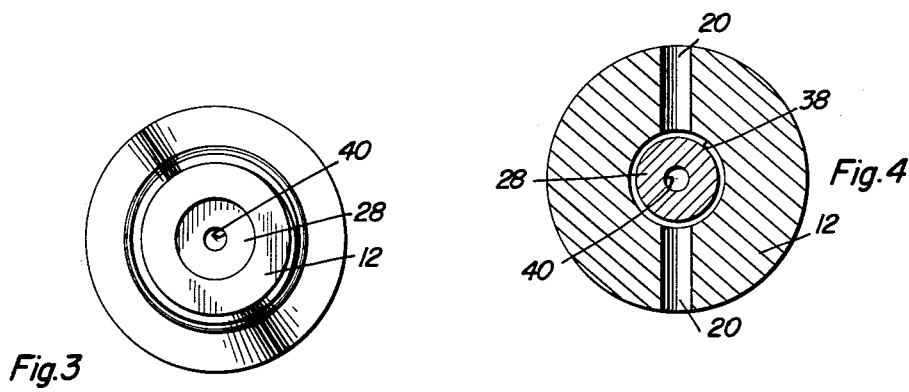
William E. Hennells
INVENTOR.

United States Patent Office 3,034,527
Patented May 15, 1962

3,034,527
SAFETY CHECK AND EXHAUST VALVE
William E. Hennells, 2392 Fuller Road, Ann Arbor, Mich.
Filed Nov. 17, 1959, Ser. No. 853,545
1 Claim. (Cl. 137—102)

This invention relates to valves and more particularly to a safety check exhaust valve.

An object of the invention is to provide a very simple, but unique valve having a valve body equipped with a sliding piston wherein the operation of the piston is based upon a differential in pressure proportionate to the differential in area to cause the valve to be actuated, there being no springs to determine the release pressure of the valve i.e. occasioned by movement of the sliding piston. Essentially, then, a valve constructed in accordance with the invention relies on actual pressure differential as opposed to spring opposition.

One of the principal features of the invention is found in the provision of a valve which is fluid-tight and which provides a quick exhaust with a predetermined ratio on the exhaust, for instance four to one. It is to be observed that the valve functions are all combined in a single valve structure.

Another object of the invention is to provide a very reliable valve of the nature disclosed which prevents blow-by resulting in the intermingling of high and low pressures.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a longitudinal sectional view of a valve in accordance with the invention.

FIGURE 2 is an enlarged sectional view showing the valve in FIGURE 1 but in a different position.

FIGURE 3 is an end elevational view of the valve.

FIGURE 4 is a cross-sectional view taken on the line 4—4 of FIGURE 1.

In the accompanying drawings there is a valve 10 illustrated. This valve represents one possible embodiment of the invention and includes a valve body 12 which is shown as being elongate with the threaded inlet port 14 at one end and an externally threaded portion 16 at the other end defining an outlet port 18. A plurality of exhaust ports 20 are radially arranged in valve body 12 adjacent to the outlet port 18.

Sliding piston 22 is mounted in valve chamber 24, the valve chamber preferably being a bore in body 12. The sliding piston has an enlarged end 26 and a reduced diameter end 28. O-rings 30 and 32 seated in grooves in the enlarged and reduced diameter portions contact the surface of valve chamber 24 and passageway 36 which forms an extension of port 18. The circumferential groove 38 is at the juncture of passageway 36 and valve chamber 38, and the chamber is of a larger diameter than passageway 36 so that the two parts of the sliding piston 22 will fit accurately in the valve chamber 24 and passageway 36 respectively.

Passage 40 extends axially through a part of the piston 22 and opens toward port 18. It also opens in registry with cavity 42 formed in the piston 22 intermediate the ends thereof. The ball check 46 consisting of a ball 48 and spring 50 is seated in cavity 42 with the spring reacting on a shoulder in the cavity at the juncture of the cavity with passage 40, and the ball 48 disposed on valve seat 52. The valve seat is formed at the inner end of a hollow plug 54 threaded into an enlarged part of cavity 42. The plug 54 has passage 58 axially therein at one end of which the valve seat 42 is formed. Passage 58 is in axial alignment with passage 40, and there is an O-ring 60 of compressible material, as are all of the O-rings in the valve 10. The O-ring 60 is seated in a shallow groove at the inner extremity of hollow plug 54 to form a seal between the plug and the part of piston 22 at cavity 42.

A second hollow plug 64 is threaded into valve chamber 24 and it has a passage 66 which is preferably in axial alignment with passage 58. The hollow plug is axially spaced from piston 22 so that in one valve position (FIGURE 1) there is a space between the piston and plug 64, the latter functioning as a stop. Shoulder 70 at the juncture of passage 36 and valve chamber 24 forms the second stop for the piston 22.

In operation the valve may be caused to function with a number of types of fluid, for example liquid or gas. Assuming gas operation, for example, air, air under pressure is applied at 14 which moves piston 22 forward in valve chamber 24. When the piston 22 slides forward an airtight seal is formed in passage 36 by entry of O-ring 32 into this passage as shown in FIGURE 2. This prevents any air from passing from passage 36 to ports 20. Ball check 42 will remain closed due to the pressure in passage 40 until the forward motion of piston 22 is stopped by engaging shoulder 70. The reason for this is that air pressure when applied at 14, will move straight through passage 66, chamber 24, passage 58, passage 40. With the valve positioned as shown in FIGURE 1 and line pressure in port 14, passage 66, chamber 24 and passage 58, the check valve 42 will open and remain open. When pressure in passage 36 and consequently, passage 40 which is registered therewith, is the same as air pressure in valve chamber 24, the ball check will close if the air pressure in passage 36 and passage 40 becomes greater than the air pressure in valve chamber 24, passage 66 and inlet port 14. The valve will act as a check valve if the air pressure in passage 36 and passage 40 becomes four times greater than the air pressure at port 14, passage 66 and chamber 24 inasmuch as the cross-sectional area of the ends of the piston 22 are in a ratio of four-to-one. Obviously, this ratio may be increased or decreased.

Piston 22 will slide back to hollow plug 64 allowing the high pressure air in passage 36 to exhaust through exhaust ports 20 without any leakage of high pressure into cavity 42, passage 58, chamber 24, passage 66 and port 14. When the ratio of pressures is at design level, for example four-to-one, or less, the piston 22 will slide forward again to shoulder 70. Consequently, the valve will undergo another cycle of operation in the manner previously described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention is claimed.

What is claimed as new is as follows:

A safety, check and exhaust valve comprising: an elongated, one-piece valve body having a cylindrical, smooth-bore passageway of small diameter extending through one end thereof, a cylindrical valve chamber of large diameter extending through the other end thereof and an intermediate, cylindrical passage of intermediate diameter located between and communicating at its respective axial ends with said passageway and said valve chamber, said passageway, said valve chamber and said intermediate passage being coaxial; the juncture of said valve chamber and said intermediate passage defining a radially extending, annular shoulder at one end of said valve chamber, and the wall means defining said chamber being threaded at the other end thereof remote from said shoulder; an annular stop plug located entirely within and spaced axially from the other end of said valve chamber and from said shoulder and having a central opening therethrough; said valve body being externally threaded at said one end thereof and having exhaust port means extending substantially radially from said intermediate passage; a piston axially slidably disposed within said valve chamber, said piston having an enlarged cylindrical end portion and annular sealing means thereon engaging the wall of said valve chamber, said enlarged end portion being axially movable between said stop plug and said shoulder, said piston having an axially extending cylindrical end portion of reduced diameter which is slidably received through, and is spaced radially inwardly from, the wall defining said intermediate passage to define an annular zone therebetween, said reduced end portion being received into said passageway and having sealing means thereon in sealing engagement with the wall of said passageway, said piston having an axially extending passage therethrough and axially aligned with the central opening in said stop plug; a check valve disposed in said axially extending passage and sensed to permit flow of fluid from said valve chamber through said axially extending passage to said passageway, and to prevent flow of fluid in the opposite direction, the length of said valve chamber with respect to the length of the enlarged end portion of said piston being such that said reduced end portion of said piston can be moved completely out of said passageway.

References Cited in the file of this patent

UNITED STATES PATENTS

| | | |
|---|---|---|
| 2,211,846 | Brown | Aug. 20, 1940 |
| 2,610,859 | Wilcox | Sept. 16, 1952 |
| 2,669,248 | Miller | Feb. 16, 1954 |